Nov. 1, 1938.  G. BLANDI  2,134,997
COOKING UTENSIL
Filed Oct. 25, 1937

Inventor:
Giacomo Blandi,
By Ben Cohen
Attorney.

Patented Nov. 1, 1938

2,134,997

UNITED STATES PATENT OFFICE 2,134,997

COOKING UTENSIL

Giacomo Blandi, Pittsburgh, Pa.

Application October 25, 1937, Serial No. 170,822

2 Claims. (Cl. 53—6)

This invention relates to an improved cooking utensil. Although the present invention is applicable to various forms of cooking utensils such as roasters, pans, pots and frying pans for cooking poultry, meats, fish, vegetables and fruits, for the purpose of more clearly illustrating this invention, I shall describe my improvement in connection with a roaster for roasting a section of meat.

The general essentials for the proper preparation of a roast are, prevent burning of the roast, constant turning of the roast so as to thoroughly cook the same, and proper basting of the roast with the juices of the meat that have settled in the bottom of the roaster.

In the old practice of roasting meats, it has been necessary to constantly remove the cover of the roaster for turning of the roast. This constant removal of the cover permits the escape of steam from within the roaster and thus some of the flavor of the roast is lost. Besides losing some of the flavor, the constant piercing of the roast by the turning fork causes the juices to run out of the roast. Also, under the old practice, it has been necessary to constantly remove the cover, and with a spoon or ladle, remove the juice from the bottom of the pan and pour it over the meat for proper basting of the meat.

As a result of the above old practice, numerous disadvantages such as, constant care on the part of the attendant in removing the cover for turning of the roast and basting, losing a portion of the savory contents of the meat resulting from the removal of the cover, danger of burning the attendant when the cover is removed existed.

Thus, a primary object of the present invention is to eliminate the aforementioned disadvantages.

A further object of the invention is to provide an improved roaster which is easy to manipulate and which produces a better cooked roast.

Other objects and advantages of the invention will be apparent from the following description taken in connection with the accompanying drawing wherein Figure 1 is a side view of the complete roaster.

Figure 1:
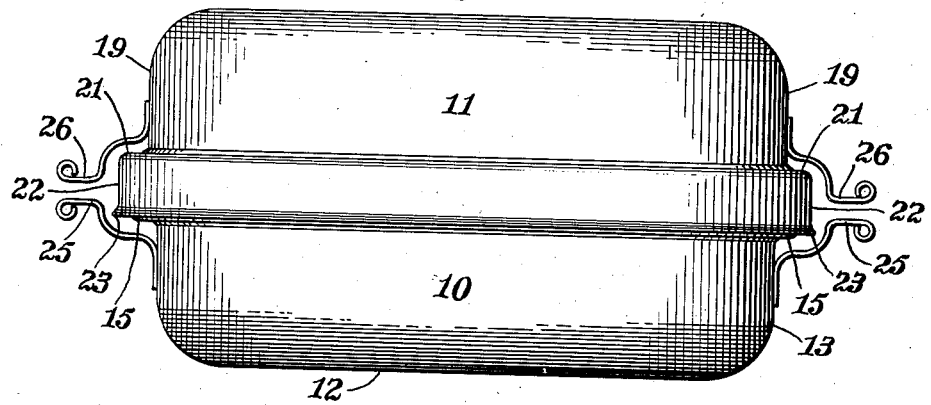

Referring to the drawing in detail, the complete utensil comprises a base portion or pan 10, and a cover 11.

The pan 10 consists, preferably, of an oval shaped vessel having its bottom and side formed from a single piece of metal, either cast or stamped, without any seams, joints or sharp angles. The bottom wall 12 is flat so as to support the roaster on a flat surface. The side wall 13 is substantially vertical and terminates in an inwardly directed edge 14. A substantially L-shaped member 15 is attached to the outer surface of the side wall of the pan adjacent the top edge thereof by means of any conventional attaching means. The vertical wall 16 of member 15 terminates in an outwardly directed edge 17, extending slightly above edge 14 of pan 10, for a purpose to be explained. Openings 18 are provided in the side wall 13 a short distance above the point of attachment between member 15 and wall 13.

The cover 11 is approximately of the same form as pan 10, though slightly larger, and, like the pan, has no sharp angles or corners at any point to make it difficult to cleanse. The cover 11 is provided with a side wall 19, terminating in an inwardly directed edge 20. The side wall 19 of the cover is also provided with an L-shaped member 21 corresponding to member 15. The member 21 has vertical wall 22 and outwardly directed edge 23 extending below edge 20. Openings 24 are provided in the side wall of the cover slightly below the point of attachment between member 21 and side wall 19.

The pan and cover are each provided with handles, 25 and 26 respectively, for separate or cooperative handling of the pan and cover.

Figure 2:
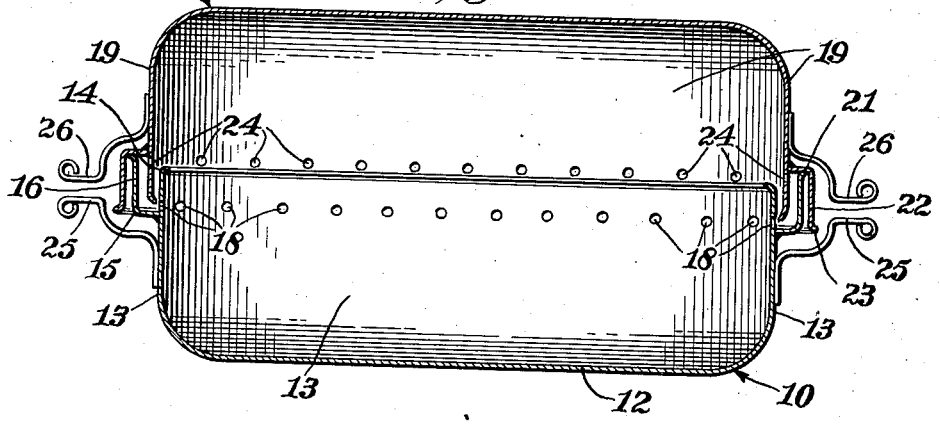
Figure 2 is a longitudinal vertical section through the same.
Figure 3:
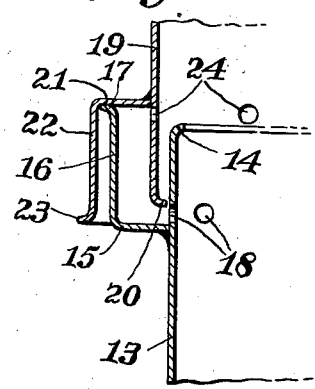
Figure 3 is a detail view, on an enlarged scale, of the joint between the body and the cover.

In the operation of my improved roaster, the meat is placed within the pan 10 and a cover positioned in place as shown in Figure 2 of the drawing. The edge 17 extending above edge 14 cooperates with member 21 so that edge 20 terminates short of the bottom of member 15 and openings 18. The meat is then cooked for a short space of time and without removing the cover the meat can be cooked on the opposite side by merely grasping the handles 25 and 26 and inverting the utensil so that the cover 11 is underneath and acts as the pan for the meat which now rests upon the cover in its inverted position. This has the same effect as turning over the meat. The juices given off in the cooking of the meat, having settled in pan 10 will drip down along the sides 13 into the cover 11 which is now the pan portion of the utensil. The flange portions 14 will direct these drippings onto the meat. After further cooking, the utensil may be again inverted causing the meat to seek the lower portion of pan 10. The juice in cover 11 will drip down the sides 19 and, because of openings 18, will return to pan 10. This procedure can be followed until the roast is completely done. It is readily apparent that this constant turning of the utensil has the effect of cooking all portions of the meat without necessitating removal of the cover to turn the meat. In addition to this, the constant inversion of the utensil permits the juices to circulate through the pan and come in contact with all portions of the roast.

It is thus apparent that with my improved roaster it is possible to roast a piece of meat without ever removing the cover while the meat is cooking and thus produce a much more savory and better cooked roast.

Although my invention has been described in connection with a roaster, it is readily apparent that it is equally applicable in the cooking of other foods. Having thus described my invention, I claim:

1. In a roaster, a bottom pan including a side wall, a substantially L-shaped member attached to the outer surface of the side wall adjacent the top thereof, the upper edge of the L-shaped member terminating at a point above the upper edge of the side wall, openings in said side wall adjacent the upper edge thereof, a cover for the pan and means on said cover cooperating with the upper edge of the L-shaped member for supporting the lower edge of the cover above the openings in the pan.

2. In a roaster, a bottom pan having a side wall, openings in the side wall adjacent the upper edge thereof, a substantially L-shaped member attached to the side wall immediately below the openings, the upper edge of the L-shaped member extending a short distance above the upper edge of the side wall, a cover for the pan and means on said cover resting on the upper edge of the L-shaped member for supporting the lower edge of the cover above the openings in the pan.

GIACOMO BLANDI.